(12) United States Patent
Kim et al.

(10) Patent No.: US 12,101,578 B2
(45) Date of Patent: Sep. 24, 2024

(54) CONTEXT-AWARE LARGE SCALE SURROUNDING VIEW WITH RSU ASSIST

(71) Applicant: Toyota Motor Engineering & Manufacturing North America, Inc., Plano, TX (US)

(72) Inventors: Baekgyu Kim, Mountain View, CA (US); Haoxin Wang, Charlotte, NC (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 340 days.

(21) Appl. No.: 17/493,232

(22) Filed: Oct. 4, 2021

(65) Prior Publication Data

US 2023/0107999 A1     Apr. 6, 2023

(51) Int. Cl.
*H04N 7/18* (2006.01)
*G01C 21/34* (2006.01)
*G08G 1/0967* (2006.01)
*H04L 65/61* (2022.01)
*H04L 67/12* (2022.01)

(52) U.S. Cl.
CPC .......... *H04N 7/181* (2013.01); *G01C 21/3476* (2013.01); *G08G 1/096783* (2013.01); *H04L 65/61* (2022.05); *H04L 67/12* (2013.01)

(58) Field of Classification Search
CPC .... H04N 7/181; H04N 7/185; G01C 21/3476; G08G 1/096783; G08G 1/096791; G08G 1/0968; H04L 67/12

USPC .......................................................... 348/148
See application file for complete search history.

(56) References Cited

U.S. PATENT DOCUMENTS

| | | | |
|---|---|---|---|
| 10,559,196 | B2 | 2/2020 | Matus et al. |
| 10,971,007 | B2 | 4/2021 | Zhang et al. |
| 11,017,663 | B2 | 5/2021 | Tsumori et al. |
| 11,030,896 | B2 | 6/2021 | Lee et al. |
| 11,037,442 | B2 | 6/2021 | Sekiguchi |
| 2015/0042806 | A1* | 2/2015 | Wierich ............ G06T 5/002 |
| | | | 348/148 |
| 2020/0090504 | A1 | 3/2020 | Kadar et al. |
| 2021/0020035 | A1 | 1/2021 | Tijink |
| 2021/0035443 | A1 | 2/2021 | Young et al. |

(Continued)

OTHER PUBLICATIONS

Automatic incident detection in smartcity using multiple traffic flowparameters via V2X communication (https://journals.sagepub.com/doi/pdf/10.1177/1550147718815845), 23 pgs, Oct. 30, 2018.

(Continued)

*Primary Examiner* — Frantz B Jean
(74) *Attorney, Agent, or Firm* — Dinsmore & Shohl LLP (57) ABSTRACT

In accordance with one embodiment of the present disclosure, a system for generating surrounding views includes a controller. The controller may be programmed to perform operations including receiving a status information from a remote source, receiving a surround view system (SVS) request having a set of requirements from a vehicle, identifying one or more remote sources based on the status information of the one or more remote sources and the set of requirements of the SVS request, and directing the one or more remote sources to stream SVS data to the vehicle.

20 Claims, 7 Drawing Sheets

(56) References Cited

U.S. PATENT DOCUMENTS

| | | | |
|---|---|---|---|
| 2021/0063200 A1* | 3/2021 | Kroepfl | C03C 17/3644 |
| 2021/0074148 A1 | 3/2021 | Kozaki et al. | |
| 2021/0142666 A1 | 5/2021 | Beaudry et al. | |
| 2021/0406679 A1* | 12/2021 | Wen | G06V 20/56 |
| 2022/0141450 A1* | 5/2022 | Pieper | G05D 1/0223 |
| | | | 348/148 |

OTHER PUBLICATIONS

A novel internet of things-enabled accident detection and reporting system for smart city environments (https://www.ncbi.nlm.nih.gov/pmc/articles/PMC6540187/, 29 pgs., May 3, 2019.

* cited by examiner

CONTEXT-AWARE LARGE SCALE SURROUNDING VIEW WITH RSU ASSIST

TECHNICAL FIELD

The present disclosure relates to surround view systems, and more particularly to context-aware large scale surround view systems with computer infrastructure assistance.

BACKGROUND

In the field of manually driven or autonomous vehicles, vehicles may be equipped with sensors to identify objects in their surrounding environment. Identifying objects can provide the vehicle and/or the driver with more information to drive more efficiently. For example, a camera can help a driver identify an object in a blind spot of the vehicle to help the driver navigate around the object. Many sensor-equipped vehicles are also equipped with network connectivity to share the data they gather about identified objects with other vehicles and/or infrastructure (e.g., edge servers). Vehicles may use data they received from other vehicles and/or infrastructure to combine with their own data to have a more comprehensive perception of their environment. For example, vehicles may use data from roadside infrastructure cameras to help vehicles see around blind spots. Furthermore, vehicles may combine the data from a plurality of onboard sensors to create a singular set of data. For example, in surround view systems, a vehicle may use multiple in-vehicle camera sensors to generate a top-down view of the vehicle and its surroundings so that the driver can have a complete view of the vehicle's surroundings. However, surround views are generally limited to the immediate surroundings of the vehicle. Therefore, it may be desirable for a driver to have a surround view at a larger scale. For example, it may be desirable for a driver to have a surround view of other vehicles, objects, and/or events to provide the driver and/or vehicle with more information to help the driver and/or vehicle make more efficient driving decisions.

SUMMARY

In accordance with one embodiment of the present disclosure, a system for generating surrounding views includes a controller. The controller may be programmed to perform operations including receiving a status information from a remote source, receiving a surround view system (SVS) request having a set of requirements from a vehicle, identifying one or more remote sources based on the status information of the one or more remote sources and the set of requirements of the SVS request, and directing the one or more remote sources to stream SVS data to the vehicle.

In accordance with another embodiment of the present disclosure, a method for generating surrounding views includes receiving a status information from a remote source, receiving a surround view system (SVS) request having a set of requirements from a vehicle, identifying one or more remote sources based on the status information of the one or more remote sources and the set of requirements of the SVS request, and directing the one or more remote sources to stream SVS data to the vehicle.

In accordance with yet another embodiment of the present disclosure, a vehicle for generating surrounding views includes a controller. The controller may be programmed to perform operations including determining a focus area related to an event of interest, transmitting an SVS request to a remote source hub including the event of interest and the focus area, receiving an SVS data stream of the event of interest from a remote source covering the focus area, and generating a surrounding view based on the SVS data stream from the remote source.

Although the concepts of the present disclosure are described herein with primary reference to automobiles and roadside infrastructure, it is contemplated that the concepts will enjoy applicability to any vehicle and sensor-equipped infrastructure. For example, and not by way of limitation, it is contemplated that the concepts of the present disclosure will also enjoy applicability to aircraft and camera-equipped airport tarmac infrastructure.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods and systems for generating context-aware large scale surround view. In embodiments disclosed herein, a connected vehicle may generate a large scale surround view. Because onboard cameras may only provide a surround view limited to the connected vehicle's immediate surrounding environment, the connected vehicle may receive camera data from remote sources. Receiving camera data from remote sources allows the connected vehicle to expand its surround views to ranges beyond the range of the cameras in its surround view systems. The connected vehicle may also receive surround views of particular objects, vehicles, and/or the like that are remote from the connected vehicle.

However, to ensure that camera data from the remote sources are sufficiently overlapping to generate a surround view, the remote sources may be coordinated by a hub. The remote sources may be, for instance, an edge server and/or a roadside unit (RSU). In embodiments presented herein, each remote source may periodically provide status information to a hub for the hub to maintain accurate information about each remote source. A user may send, via a connected vehicle, a surround view system (SVS) request to the hub.

Upon receiving the SVS request, the hub may identify remote sources that meet a set of requirements from the SVS request. The hub may then direct the identified remote sources to stream SVS data to the vehicle. The vehicle may synthesize the data from each remote source to generate a surround view as requested in the SVS request.

Figure 1:
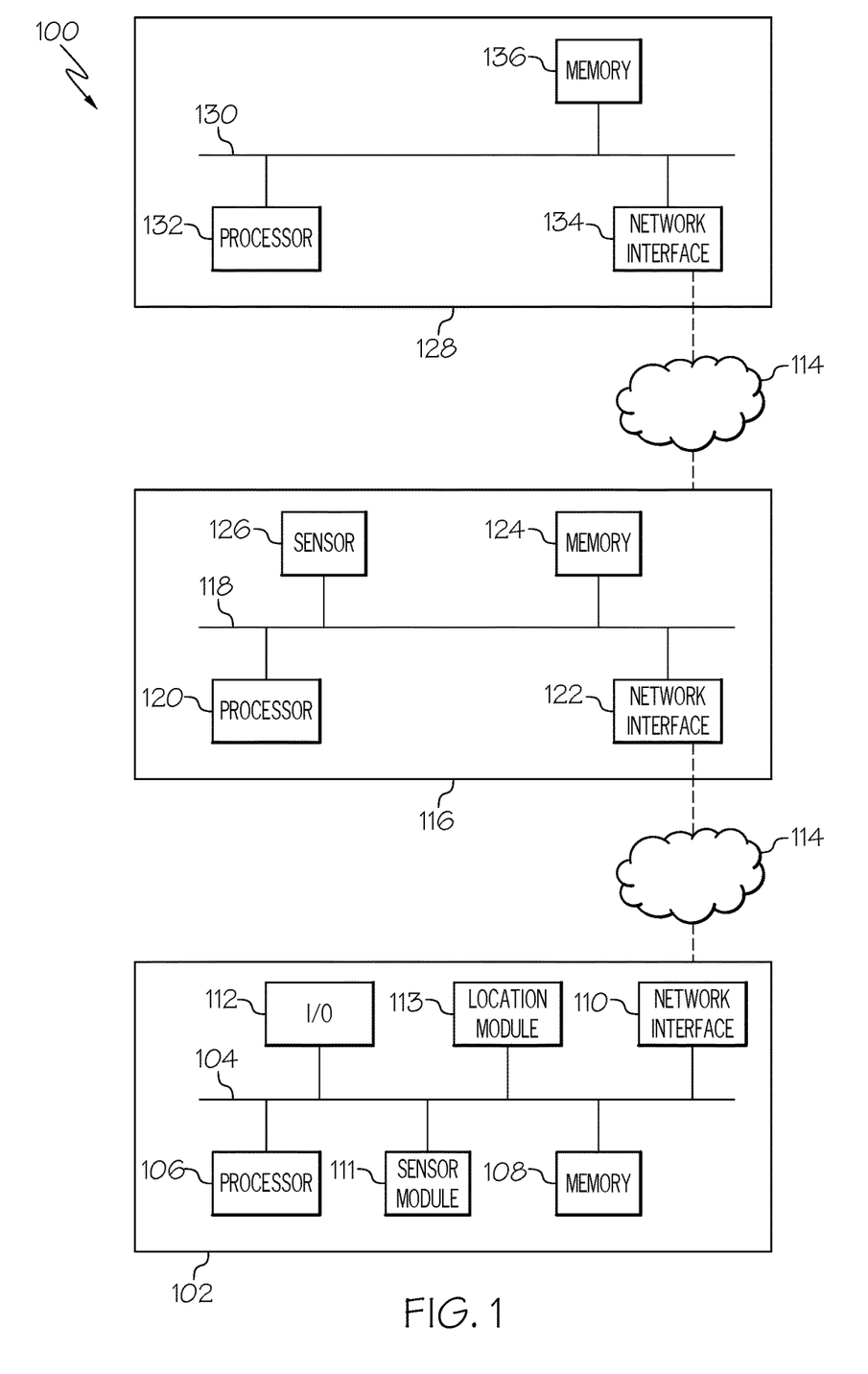
FIG. 1 schematically depicts a system comprising a connected vehicle, a remote source, and a hub, according to one or more embodiments shown and described herein.
Figure 2:
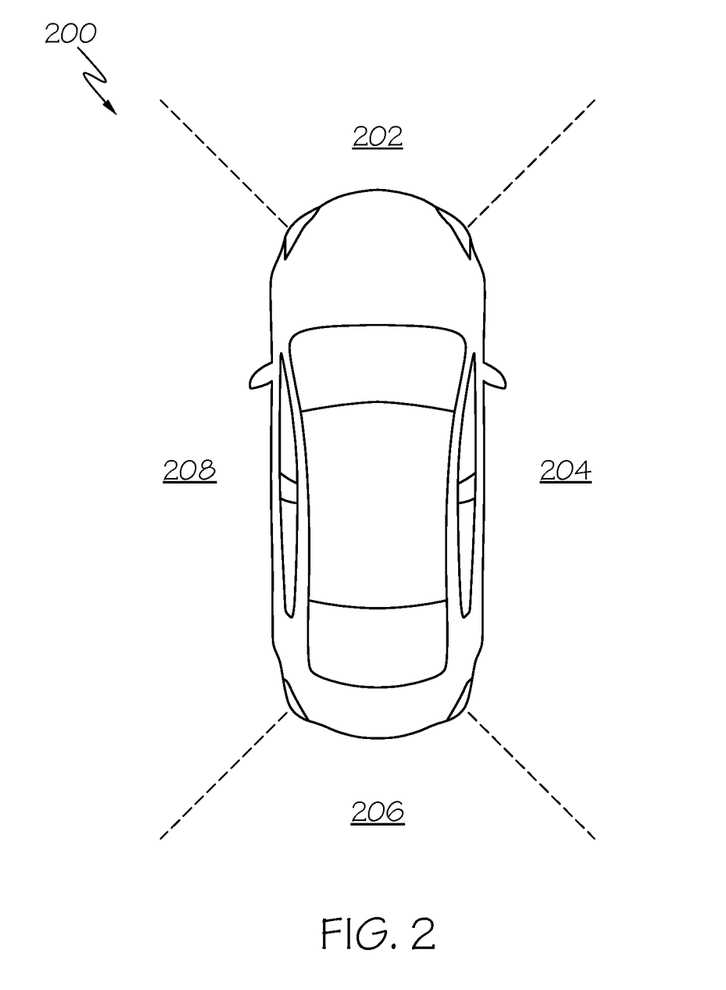
FIG. 2 depicts a surround view generated by a connected vehicle, according to one or more embodiments shown and described herein.
Figure 3:
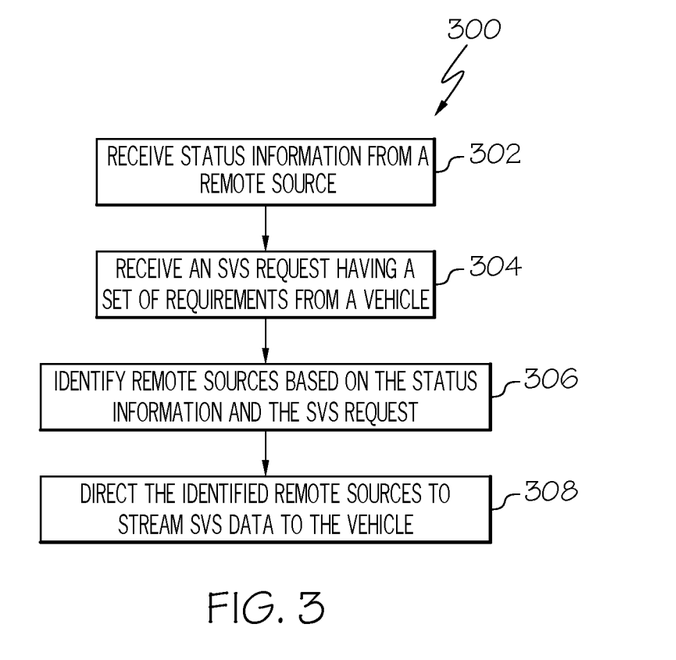
FIG. 3 depicts an example method performed by a hub, according to one or more embodiments shown and described herein.

As described in detail herein, system may contain the components as shown in FIG. 1. The connected vehicle of FIG. 1 may generate surround views as shown in FIG. 2. The system may operate in an example scenario as shown in FIG. 3, wherein the hub performs the example method of FIG. 4 and connected vehicles perform the example methods of FIGS. 5 and/or 6. The steps performed by the system in the example scenario of FIG. 3 may be performed as shown in FIG. 7.

Referring now to FIG. 1, a system comprising a connected vehicle 102, a remote source 116, and a hub 128 is schematically depicted. The connected vehicle 102 may be an automobile such as a terrestrial vehicle, an aquatic vehicle, an aerial vehicle, or any other passenger or non-passenger vehicle. In some embodiments, the vehicle is an autonomous vehicle that navigates its environment with limited or no human input. The connected vehicle 102 may include a processor 106, a memory module 108, an input/output module 112 (i.e., I/O module 112), and a network interface module 110. The connected vehicle 102 also may include a communication path 104 that communicatively connects the various components of the connected vehicle 102.

The processor 106 may include one or more processors that may be any device capable of executing machine-readable and executable instructions. Accordingly, each of the one or more processors of the processor 106 may be a controller, an integrated circuit, a microchip, or any other computing device. The processor 106 is coupled to the communication path 104 that provides signal connectivity between the various components of the connected vehicle. Accordingly, the communication path 104 may communicatively couple any number of processors of the processor 106 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 104 may be formed from any medium that is capable of transmitting a signal such as, e.g., conductive wires, conductive traces, optical waveguides, and the like. In some embodiments, the communication path 104 may facilitate the transmission of wireless signals, such as Wi-Fi, Bluetooth®, Near-Field Communication (NFC), and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory module 108 is coupled to the communication path 104 and may contain one or more memory modules comprising RAM, ROM, flash memories, hard drives, or any device capable of storing machine-readable and executable instructions such that the machine-readable and executable instructions can be accessed by the processor 106. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory module 108. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory module 108 may contain instructions for performing methods described herein. The memory module 108 may also contain machine-readable instructions for processing SVS data. For example, the memory module 108 may contain machine-readable instructions for stitching images together to form a surround view. The memory module 108 may further contain machine-readable instructions for identifying objects and/or events within images. For example, a user may request a surround view of the nearest traffic event and the processor, via instructions stored in the memory module 108, may determine the traffic event to be road construction.

The input/output module 112, or I/O module 112, is coupled to the communication path 104 and may contain hardware for receiving input and/or providing output. Hardware for receiving input may include devices that send information to the processor 106. For example, a keyboard, mouse, scanner, touchscreen, and camera are all I/O devices because they provide input to the processor 106. Hardware for providing output may include devices from which data is sent. For example, an electronic display, speaker, and printer are all I/O devices because they output data from the processor 106.

The connected vehicle 102 also comprises a network interface module 110 that includes network connectivity hardware for communicatively coupling the connected vehicle 102 to other network-attached devices, such as connected vehicles, connected infrastructure, and the like. The network interface module 110 can be communicatively coupled to the communication path 104 and can be any device capable of transmitting and/or receiving data via a network 114 or other communication mechanisms. Accordingly, the network interface module 110 can include a communication transceiver for sending and/or receiving any wired or wireless communication. For example, the network connectivity hardware of the network interface module 110 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices.

The connected vehicle 102 may connect with one or more other connected vehicles and/or external processing devices (e.g., a server) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

A location module 113 is coupled to the communication path 104 such that the communication path 104 communicatively couples the location module 113 to other modules of the connected vehicle 102. The location module 113 may comprise one or more antennas configured to receive signals from global positioning system (GPS) satellites or any other satellite system. Specifically, in one embodiment, the location module 113 includes one or more conductive elements that interact with electromagnetic signals transmitted by GPS satellites. The received signal is transformed into a data signal indicative of the location (e.g., latitude and longitude) of the location module 113, and consequently, the connected vehicle 102.

The remote source 116 may generally include components such as a processor 120, a memory module 124, a network interface module 122, a sensor module 126, and a communication path 118. Each component of the remote source 116 is similar in structure and function to its counterpart of the connected vehicle 102, described in detail above and will not be repeated. The remote source 116 further includes a sensor module 126.

The sensor module 126 is coupled to the communication path 118 and communicatively coupled to the processor 120. The sensor module 126 may include, e.g., LiDAR sensors, RADAR sensors, optical sensors (e.g., cameras), laser sensors, proximity sensors, location sensor, and the like. In embodiments, the sensor module 126 may monitor the surroundings of the connected vehicle 102 and may detect other vehicles and/or traffic infrastructure.

The remote source 116 may be an edge server, a roadside unit (RSU), or the like. The remote source 116 may be communicatively coupled to one or more connected vehicles, such as connected vehicle 102, via a network 114. The network 114 may be a wide area network, a local area network, a personal area network, a cellular network, a satellite network, and the like. The remote source 116 may have a coverage area wherein the sensor module 126 of the remote source 116 can capture surround view data of an object or event. The remote source 116 may have a coverage area that may overlap with the coverage area of one or more other remote sources.

The hub 128 may generally include components such as a processor 132, a memory module 136, a network interface module 134, and a communication path 130. Each component of the hub 128 is similar in structure and function to its counterpart of the connected vehicle 102 and the remote source 116, described in detail above and will not be repeated. The memory module 136 may also include a database of status information from one or more remote sources. The memory module 136 may also include a database of SVS request information from one or more connected vehicles. The hub 128 may be a server or any other computing device and may be communicatively coupled to one or more remote sources, such as remote sources 116, via a network 114. The hub 128 may be a regional hub that services remote sources 116 in a particular geographic location and may be subordinate to another hub that manages one or more regional hubs.

Referring now to FIG. 2, a surround view generated by a connected vehicle 102 is depicted. A connected vehicle 102 may have multiple cameras as part of its sensor module 111. Each camera may have a field of view that overlaps with another such that all 360 degrees around the vehicle have at least some camera field of view coverage. The processor 106 of the connected vehicle 102 may stitch together the overlapping portions of the fields of view to create a surround view such that the surround view appears to be a single, seamless image of the vehicle. The processor 106 may also modify and/or transform the camera images to give the appearance of the surround view being taken from above the vehicle. It should be noted that the surround view from onboard cameras may be limited to showing approximately a dozen feet from the connected vehicle 102. For that reason, the systems presented herein may be desirable for generating surround views of events and/or objects remote from the vehicle (e.g., several miles from the vehicle).

For example, a connected vehicle 102 may have four cameras: a front camera, two side cameras, and a back camera. The front camera may be positioned in the grill or the back of the rearview mirror and has a field of view 202 that covers the area ahead of the connected vehicle 102. The two side cameras may be positioned with one camera on each side mirror. The two side cameras may have a wide angle lens to cover a longer field of view due to the elongated nature of the connected vehicle 102. The two side cameras may cover fields of view 204, 208. The back camera may be positioned on the rear of the connected vehicle 102 and has a field of view 206 that covers the area behind the connected vehicle 102. The back camera may also function as a back-up camera. The processor 106 of the connected vehicle 102 may stitch the camera images together where the fields of view overlap. Particularly, the processor 106 may stitch the images together at fields of view 202, 204, fields of view 204, 206, fields of view 206, 208, and fields of view 208, 202. The processor 106 may also modify the image by placing a computer generated image of a top view of the connected vehicle 102 to give the appearance that the surround view is taken from above the vehicle rather than from the onboard cameras.

Referring now to FIG. 3, an example method 300 performed by a hub 128 is depicted. In step 302, the hub 128 may receive status information from a remote source 116. The remote source 116 may periodically send status information to the hub 128. The status information may include information such as image format, image resolution, view coverage, location, billing plan, and/or any other information about the remote source 116. It should be understood that image format and image resolution may apply to still images as well as video, and a focus area may include a geographic area that the remote source 116 has sensor coverage. In some embodiments, the hub 128 may solicit status information from remote sources 116. The hub 128 may store the received status information in a database, which may be located in the memory module 136. This step ensures that the hub 128 has up-to-date information about each remote source and can help identify malfunctioning remote sources.

In step 304, the hub 128 may receive an SVS request from a connected vehicle 102. The connected vehicle 102 may send an SVS request directly to the hub 128 and/or indirectly, such as via the remote source 116. The SVS request may have a set of requirements. For example, the set of requirements may include an image format, image resolution, billing plan, event of interest, focus area, and any other information related to selecting a remote source. The set of requirements may be determined by the user and/or by the vehicle. For example, the user may not want to pay more than a certain amount for use of a remote source and the vehicle may only be compatible with video streaming codecs (i.e., image format). It should be understood that image format and image resolution may apply to still images as well as video. It should also be understood that an event of interest may include, for example, a traffic event, a vehicle, and/or a location, and a focus area may include a geographic area that the remote source 116 has sensor coverage.

In step 306, the hub 128 may identify one or more remote sources based on the status information of the one or more remote sources and the set of requirements of the SVS request. The hub 128 may filter the available remote sources based on the set of requirements of the SVS request. For example, the hub 128 may have a database of remote sources populated by status information periodically received from each remote source. The hub 128 may generate a database search query comprising the set of requirements of the SVS request to generate a list of remote sources that potentially satisfy the SVS request. The hub 128 may further filter the list of remote sources by identifying multiple remote sources that have overlapping focus areas encompassing the event of interest. For example, the hub 128 may select two remote sources on one side of a road on which the event of interest is located and two remote sources on the other side of the road such that all four remote sources have overlapping fields of view that in combination encompass the event of interest to allow for the generating of a surround view. In some embodiments, the hub 128 may perform authentication and/or authorization checks to ensure that the connected vehicle 102 has proper SVS access permission.

In step 308, the hub 128 may direct the one or more remote sources to stream SVS data to the connected vehicle 102. The hub 128 may send a control signal to the identified remote sources from step 306 instructing them to stream SVS data to the connected vehicle 102. The identified remote sources may stream SVS data directly to the connected vehicle 102. In which case, the connected vehicle 102 may stitch the streamed SVS data to generate a surround view. In some embodiments, the hub 128 may direct a first remote source of the identified remote sources to stream SVS data to a second remote source of the one or more remote sources to generate a pooled SVS data, and then direct the second remote source to stream the pooled SVS data to the connected vehicle 102. Pooling the SVS data may allow for more efficient transfer to the connected vehicle 102, for example by balancing the transfer load between the remote sources. In some embodiments, the hub 128 may direct a first remote source of the one or more remote sources to stream SVS data to a second remote source of the one or more remote sources to generate a pooled SVS data, and then direct the second remote source to generate a surround view from the pooled SVS data before sending the surround view to the connected vehicle 102. Pooling the SVS data and synthesizing the pooled SVS data to generate a surround view remote from the vehicle may be more efficient for vehicles without sufficient computational power to synthesize the SVS data into a surround view.

Figure 4:
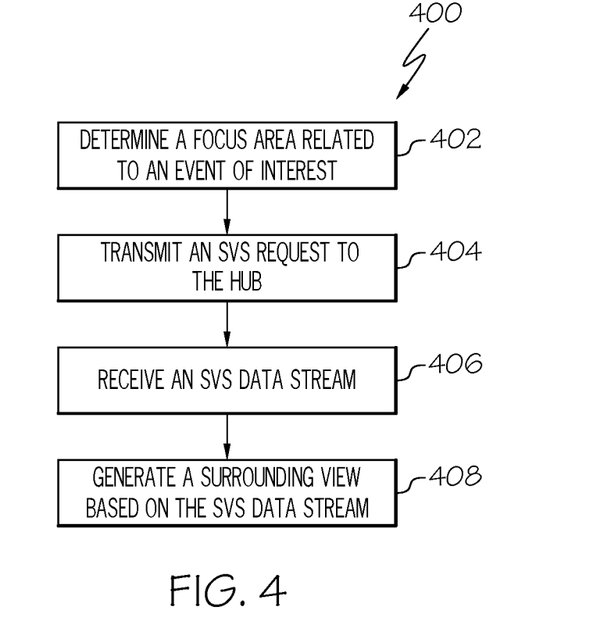
FIG. 4 depicts an example method performed by a connected vehicle, according to one or more embodiments shown and described herein.

Referring now to FIG. 4, an example method 400 performed by a connected vehicle 102 is depicted. In step 402, the connected vehicle 102 may determine a focus area related to an event of interest. An event of interest may be a collision, a construction zone, a traffic zone, a vehicle, and/or any other object on a road. The event of interest may be identified by the user. For example, the user may spot an event of interest further down the road and request a surround view of the event. The event of interest may also or instead be identified by navigation information and/or shared from other connected vehicles. For example, the connected vehicle 102 may receive navigation information to a destination including a route information to the destination and events of interest along the route. Upon identification of the event of interest, the connected vehicle 102 may also determine a focus area. The focus area may include a location (e.g., GPS coordinates), camera angles (e.g., number of remote sources and/or their locations), coverage area (e.g., 10-meter radius of the event of interest), and any other information relating to the area of the event of interest. The focus area may be user-selected and/or vehicle-selected. For example, a user may select the event of interest and the desired coverage area of a 10-meter radius of the event of interest, whereas the vehicle may determine that the event of interest is located at a particular coordinate location and that the event of interest is small enough to be sufficiently covered by two remote sources. In some embodiments, the hub 128 may maintain a list of events of interest collected from SVS requests from other connected vehicles and send the list of events or a subset thereof to the connected vehicle 102 to determine a focus area. In some embodiments, the focus area may be a size and/or location of the event of interest.

In step 404, the connected vehicle 102 may transmit an SVS request to a hub 128. The SVS request may include the event of interest and the focus area. The connected vehicle 102 may send an SVS request directly to the hub 128 and/or indirectly, such as via the remote source 116. The SVS request may have a set of requirements. For example, the set of requirements may include an image format, image resolution, billing plan, event of interest, focus area, and any other information related to selecting a remote source. The set of requirements may be determined by the user and/or by the vehicle. For example, the user may not want to pay more than a certain amount for use of a remote source and the vehicle may only be compatible with video streaming codecs (i.e., image format). It should be understood that image format and image resolution may apply to still images as well as video. It should also be understood that an event of interest may include, for example, a traffic event, a vehicle, and/or a location, and a focus area may include a geographic area that the remote source 116 has sensor coverage. The hub 128 may then filter the available remote sources based on the set of requirements of the SVS request. For example, the hub 128 may have a database of remote sources populated by status information periodically received from each remote source. The hub 128 may generate a database search query comprising the set of requirements of the SVS request to generate a list of remote sources that potentially satisfy the SVS request. The hub 128 may further filter the list of remote sources by identifying multiple remote sources that have overlapping focus areas encompassing the event of interest. For example, the hub 128 may select two remote sources on one side of a road on which the event of interest is located and two remote sources on the other side of the road such that all four remote sources have overlapping fields of view that in combination encompass the event of interest to allow for the generating of a surround view. In some embodiments, the hub 128 may perform authentication and/or authorization checks to ensure that the connected vehicle 102 has proper SVS access permission.

In step 406, the connected vehicle 102 may receive an SVS data stream of the event of interest from one or more remote sources covering the focus area, such as the remote source 116. The SVS data stream may be the transfer of any multimedia information via the network interface module 110 of the connected vehicle 102 and the network interface module 122 of the remote source 116. The multimedia information may include photos, videos, or any other type of multimedia in any computer-readable format. For example, computer-readable formats for photos may include JPEG, WEBP, PNG, HEIF, and the like, and computer-readable formats for videos may include MPEG, WEBM, AVI, MOV, and the like. Multimedia information that includes video may be streamed directly or indirectly to the connected vehicle 102. Video stream formats may include HLS, RTMP, WebRTC, SRT, and the like. Multiple remote sources may stream SVS data to the connected vehicle 102. In which case, the connected vehicle 102 may stitch the streamed SVS data to generate a surround view. In some embodiments, a first remote source of the multiple remote sources may stream SVS data to a second remote source of the multiple remote sources to generate pooled SVS data, and then the second remote source may stream the pooled SVS data to the connected vehicle 102. Pooling the SVS data may allow for more efficient transfer to the connected vehicle 102, for example by requiring that the connected vehicle 102 only maintain a single network connection. In some embodiments, a first remote source of the multiple remote sources may stream SVS data to a second remote source of the multiple remote sources to generate a pooled SVS data, the second remote source may generate a surround view from the pooled SVS data and send the surround view to the connected vehicle 102. Pooling the SVS data and synthesizing the pooled SVS data to generate a surround view remote from the vehicle may be more efficient if the connected vehicle 102 does not have sufficient computational power to synthesize the SVS data into a surround view.

In step 408, the connected vehicle 102 may generate a surrounding view based on the SVS data stream from the remote source 116. The connected vehicle 102 may receive multiple SVS data streams from multiple remote sources 116. The camera, or other sensor, of each remote source may have a field of view that overlaps with another such that all 360 degrees around the event of interest have at least some view coverage. The processor 106 of the connected vehicle 102 may stitch together the overlapping portions of the fields of view to create a surround view such that the surround view appears to be a single, seamless image of the event of interest. The processor 106 may also modify and/or transform the SVS data streams to give the appearance of the surround view being taken from above the event of interest. In some embodiments, the connected vehicle 102 may receive a surrounding view from the remote source 116, in which case the connected vehicle 102 does not need to perform step 408.

Figure 5:
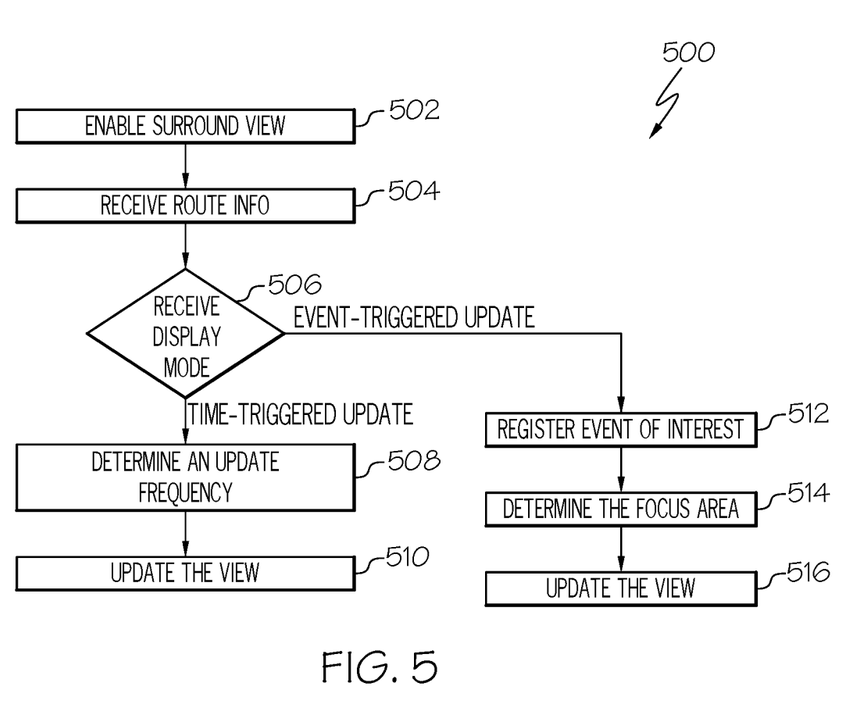
FIG. 5 depicts another example method performed by a connected vehicle, according to one or more embodiments shown and described herein.

Referring now to FIG. 5, another example method 500 performed by a connected vehicle 102 is depicted. The example method 500 illustrates a variety of display modes that may be used in the context-aware large scale surrounding view system as described herein. In step 502, the surrounding view system may be enabled. This may be performed manually (e.g., by the driver) or automatically (e.g., by the connected vehicle 102). For example, the connected vehicle 102 may automatically enable the surrounding view system when the connected vehicle 102 is started.

In step 504, the connected vehicle 102 may receive route information. The driver may enter, via the I/O module 112 of the connected vehicle 102, a destination into a navigation system. The connected vehicle 102 may receive navigation information to a destination including the route information to the destination and events of interest along the route.

In step 506, the connected vehicle 102 may receive a display mode. The driver or the connected vehicle 102 may select the display mode. The display modes include an event-triggered update mode and a time-triggered update mode. The driver may select the display mode via the I/O module 112 of the connected vehicle 102. Additionally or alternatively, the connected vehicle 102 may automatically select a driving mode. For example, if the route information received in step 504 includes events of interest along the route, the vehicle may automatically select the event-triggered update mode. If the time-triggered update mode is selected, the method 500 proceeds to steps 508 and 510. If the event-triggered update mode is selected, the method 500 proceeds to steps 512, 514, and 516.

In step 508, the connected vehicle 102 determines a frequency of updating a view of an area. The frequency may be any time period. For example, the frequency may be a number of minutes and/or seconds. The update frequency may be based on the set of requirements in the SVS request transmitted by the connected vehicle 102 in step 404 of method 400. As a reminder, the set of requirements may include an image format, image resolution, billing plan, event of interest, focus area, and any other information related to selecting a remote source. For example, if the driver or connected vehicle 102 selects an image format and/or image resolution that results in more data being transmitted, the connected vehicle 102 may determine that it does not need to update the view as frequently. As another example, if the billing plan of the remote source 116 is determined based on the number of updates or amount of data streamed to the connected vehicle 102, the connected vehicle 102 may determine that it does not need to update the view as frequently. As yet another example, if the event of interest is dynamic, such as a traffic jam, the connected vehicle 102 may determine that it may need to update the view more frequently. In some embodiments, the update frequency may be based on infrastructure availability and/or constraints. For example, remote sources that service many vehicles on a busy road may not be able to update as frequently because the network may be congested.

In step 510, the connected vehicle 102 may update its surround view at a frequency determined in step 508. The connected vehicle 102 may update its surround view by methods described herein, such as method 400. For example, the connected vehicle 102 may transmit an SVS request to the hub 128, receive one or more SVS data streams from one or more remote sources (e.g., remote source 116), and generate a surrounding view based on the SVS data streams from the remote sources.

In step 512, in response to receiving a selection of an event-triggered update mode, the connected vehicle 102 may register an event of interest. An event of interest may be a collision, a construction zone, a traffic zone, a vehicle, and/or any other object on a road. The event of interest may be identified by the user. For example, the user may spot an event of interest further down the road and request a surround view of the event. The event of interest may also or instead be identified by navigation information and/or shared from other connected vehicles. For example, the connected vehicle 102 may receive navigation information to a destination including a route information to the destination and events of interest along the route.

In step 514, in response to receiving a selection of an event-triggered update mode, the connected vehicle 102 may determine the focus area related to the event of interest. The focus area may include a location (e.g., GPS coordinates), camera angles (e.g., number of remote sources and/or their locations), coverage area (e.g., 10-meter radius of the event of interest), and any other information relating to the area of the event of interest. The focus area may be user-selected and/or vehicle-selected. For example, a user may select the event of interest and the desired coverage area of a 10-meter radius of the event of interest, whereas the vehicle may determine that the event of interest is located at a particular coordinate location and that the event of interest is small enough to be sufficiently covered by two remote sources. In some embodiments, the hub 128 may maintain a list of events of interest collected from SVS requests from other connected vehicles and send the list of events or a subset thereof to the connected vehicle 102 to determine a focus area. In some embodiments, the focus area may be a size and/or location of the event of interest.

In step 516, in response to receiving a selection of an event-triggered update mode, the connected vehicle 102 may update its surround view to the event of interest determined in step 512 at a focus area determined in step 514. The connected vehicle 102 may update its surround view by methods described herein, such as method 400. For example, the connected vehicle 102 may determine a focus area related to an event of interest, transmit an SVS request to the hub 128, receive one or more SVS data streams from one or more remote sources (e.g., remote source 116), and generate a surrounding view based on the SVS data streams from the remote sources.

Figure 6:
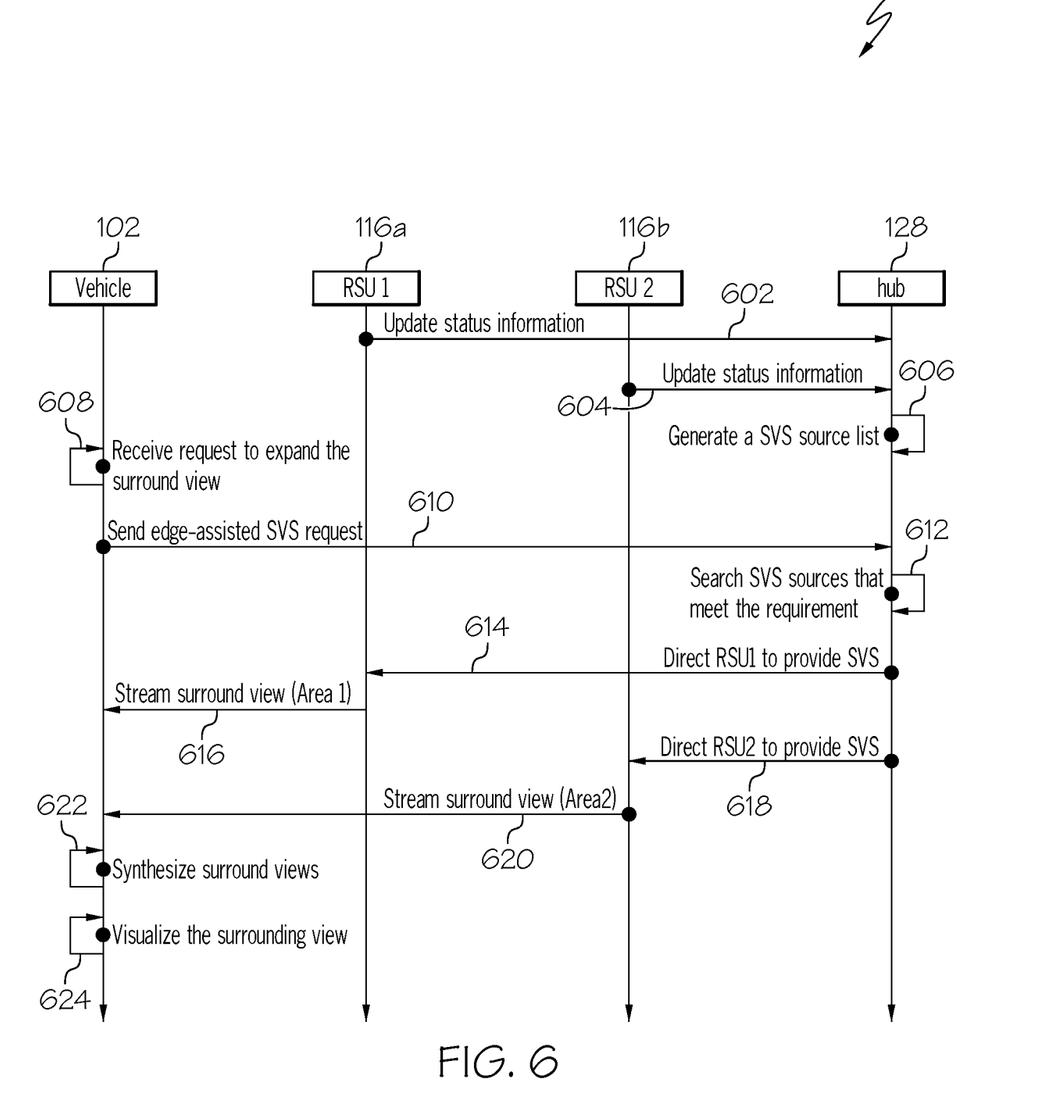
FIG. 6 depicts an example method performed by the system of FIG. 1, according to one or more embodiments shown and described herein.
Figure 7:
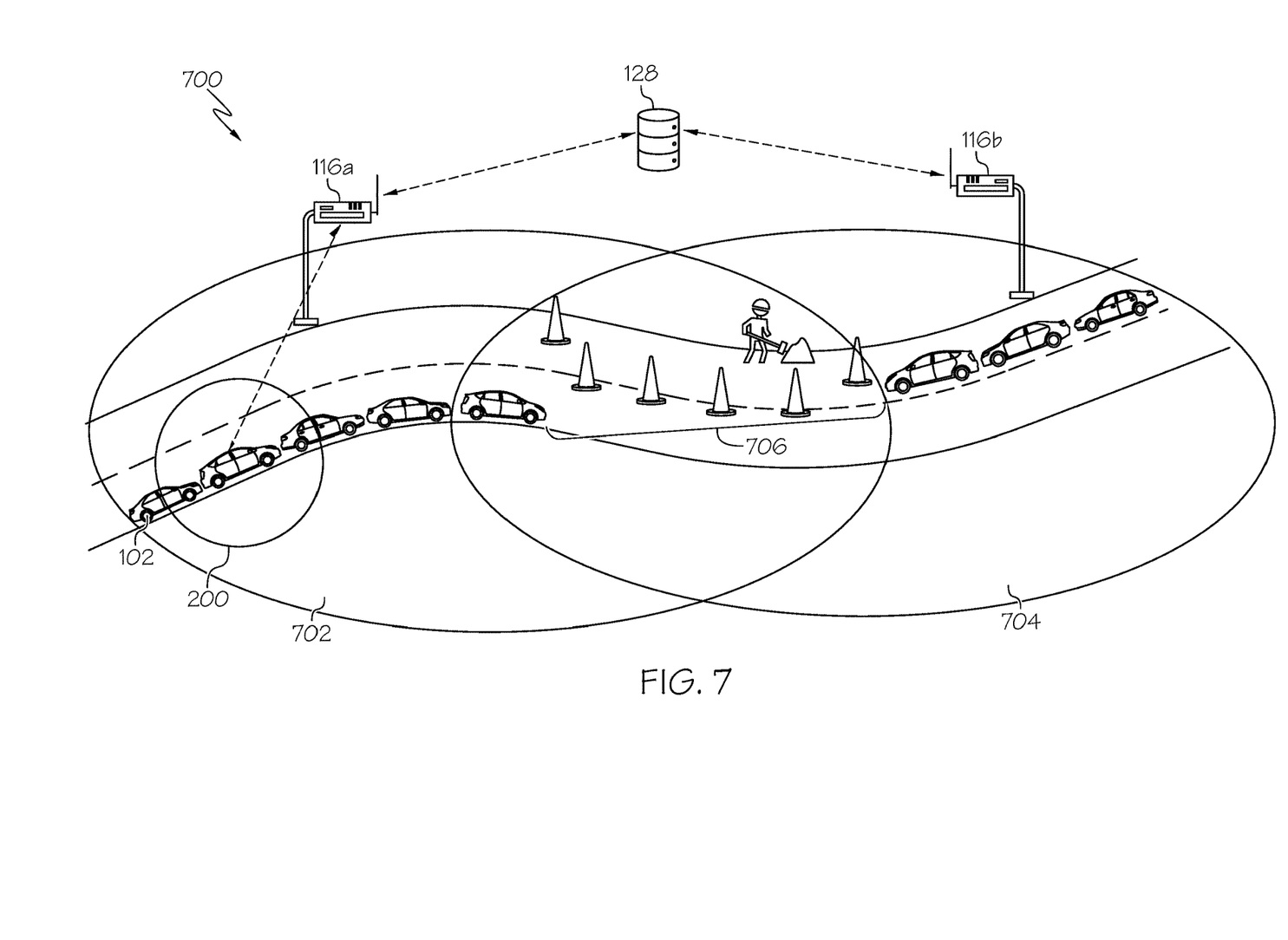
FIG. 7 depicts an example scenario comprising a connected vehicle, a remote source, a hub, and an event of interest, according to one or more embodiments shown and described herein.

Referring now to FIG. 6, an example method 600 performed by the system 100 of FIG. 1 is depicted. The system 100 includes a connected vehicle 102, two remote sources 116a, 116b (i.e., RSU1 and RSU2), and hub 128. The vertical arrows represent time and horizontal arrows represent actions, wherein horizontal arrows that appear higher on the vertical arrows occur sooner than horizontal arrows that appear lower on the vertical arrows. The rounded arrows represent internal processing performed by the device indicated at the top of the corresponding vertical line.

In steps 602, 604, the remote sources 116a, 116b may update the status information that the hub 128 has stored for each remote source. The remote sources 116a, 116b may periodically send status information to the hub 128. The status information may include information such as image format, image resolution, view coverage, location, billing plan, and/or any other information about the remote sources 116a, 116b. It should be understood that steps 602, 604 are not necessarily performed in the order, at the times, or for the number of times shown in FIG. 6.

In step 606, the hub 128 may generate an SVS source list, also referred to as a database of remote sources. The hub 128 may store the received status information from steps 602, 604 in the database, which may be located in the memory module 108. This step ensures that the hub 128 has up-to-date information about each remote source and can help identify available remote sources. For example, if the hub 128 stopped receiving updated status information from remote source 116b, then the hub 128 would know that remote source 116b is likely no longer an available remote source and will not include it in its search for remote sources that meet a vehicle's requirements.

In step 608, the connected vehicle 102 may receive a request to expand its surround view to a larger surround view that may be based on a context. The surround view of the connected vehicle 102 may be the surround view 200 as shown in FIG. 2. The request may be sent to the connected vehicle 102 manually (e.g., by the driver) or automatically (e.g., by the connected vehicle 102). For example, the connected vehicle 102 may manually receive a request to expand its surround view when the driver selects an option to expand the surround view via a touch screen (i.e., I/O module 112). The connected vehicle may automatically receive a request to expand its surround view when the driver selects a time-triggered update mode or an event-triggered update mode as described in the discussion of FIG. 5.

In step 610, the connected vehicle 102 may send an SVS request to the hub 128. The SVS request may have a set of requirements. After the request to expand the surround view in step 608 and before the sending of the SVS request, the connected vehicle 102 may compile the set of requirements. The set of requirements may include an image format, image resolution, billing plan, event of interest, focus area, and any other information related to selecting a remote source.

In step 612, the hub 128 may identify one or more remote sources based on the status information of the one or more remote sources and the set of requirements of the SVS request. For example, the hub 128 may have a database of remote sources populated by status information periodically received from each remote source. The hub 128 may generate a database search query comprising the set of requirements of the SVS request to generate a list of remote sources that potentially satisfy the SVS request. The hub 128 may further filter the list of remote sources by identifying multiple remote sources that have overlapping focus areas encompassing the event of interest. The hub 128 may also perform authentication and/or authorization checks to ensure that the connected vehicle 102 has proper SVS access permission. In FIG. 6, the hub 128 selected RSU1 116a and RSU2 116b because their coverages encompass the event of interest such that a surround view may be generated.

In step 614, the hub 128 may direct the remote source 116a to stream SVS data to the connected vehicle 102. SVS data may include photos, videos, and any other multimedia data. The hub 128 may send a control signal to the remote source 116a instructing it to stream SVS data to the connected vehicle 102.

In step 616, the remote source 116a may stream SVS data directly to the connected vehicle 102. In some embodiments, the hub 128 may direct the remote source 116a to stream SVS data to the remote source 116b to generate pooled SVS data. Then, the hub 128 may direct the remote source 116b to stream the pooled SVS data to the connected vehicle 102.

In step 618, the hub 128 may also direct the remote source 116b to stream SVS data to the connected vehicle 102. SVS data may include photos, videos, and any other multimedia data. The hub 128 may send a control signal to the remote source 116b instructing it to stream SVS data to the connected vehicle 102.

It should be understood that steps 612, 614, 616, 618 are not necessarily performed in the order, at the times, or for the number of times shown in FIG. 6.

In step 620, the remote source 116b may stream SVS data directly to the connected vehicle 102. In some embodiments, the hub 128 may direct the remote sources 116a, 116b to stream SVS data to the hub 128 to generate pooled SVS data. Then, the hub 128 may stream the pooled SVS data to the connected vehicle 102.

In step 622, the connected vehicle 102 may generate a surrounding view based on the SVS data streams from the remote sources 116a, 116b. The camera, or other sensor, of each remote source may have a field of view that overlaps with another such that all 360 degrees around the event of interest have at least some view coverage. The processor 106 of the connected vehicle 102 may stitch together the overlapping portions of the fields of view to create a surround view such that the surround view appears to be a single, seamless image of the event of interest. The processor 106 may also modify and/or transform the SVS data streams to give the appearance of the surround view being taken from above the event of interest. In some embodiments, the connected vehicle 102 may receive a surrounding view, such as from the remote source 116, in which case the connected vehicle 102 does not need to perform step 408.

In step 624, the connected vehicle 102 may provide the surrounding view to an electronic display via I/O module 112 for presenting to the driver.

Referring now to FIG. 7, an example scenario 700 comprising a connected vehicle 102, a first remote source 116a, a second remote source 116b, a hub 128, and an event of interest 706 is depicted. The example scenario 700 corresponds to the example method 600. The connected vehicle 102 is driving on a road with other connected vehicles and non-connected vehicles. The connected vehicle 102 can generate a surround view 200 so that the driver can see around the connected vehicle 102, including the vehicles ahead and behind the connected vehicle 102. However, the driver cannot see the construction zone 706 down the road, let alone a surround view of the construction zone 706. To generate a surround view of the construction zone 706, the driver may initialize a large scale surround view mode via a touchscreen (i.e., I/O module 112), or the connected vehicle 102 may be aware of road context (i.e., the construction zone 706) and automatically initialize a large scale surround view mode.

Independent of the connected vehicle 102 initializing the large scale surround view mode, the remote sources 116a, 116b may update the status information that the hub 128 has stored for each remote source. For example, the remote sources 116a, 116b may tell the hub 128 that they are capable of streaming HEVC encoded video in MP4 format at a resolution of up to 640×480 and a framerate of up to 30 frames per second. The remote sources 116a, 116b may also tell the hub 128 that they have view coverage of areas 702, 704, respectively, and are located on the same road. The areas 702, 704 may be designated by their coordinates and/or their size. The remote sources 116a, 116b may be configured to perform image recognition on their view coverage to identify a construction zone 706 to report to the hub 128 as an event of interest. The remote sources 116a, 116b may also tell the hub 128 that their billing plan permits them to only stream SVS data to vehicles having an SVS data streaming subscription plan.

When the hub 128 receives the status information from the remote sources 116a, 116b, the hub 128 may update a database of remote sources. In some embodiments, the hub 128 may also maintain a database of events of interest and update the database of events of interest to include the construction zone 706.

In response to the initialization of the large scale surround view mode, the connected vehicle 102 may send an SVS request to the hub 128. The SVS request may have a set of requirements. The set of requirements may include a list of compatible formats (e.g., MP4, AVC, and the like) and a 640×480 resolution or better at any framerate. The set of requirements may also include the location of the construction zone 706, as determined by the navigation system of the connected vehicle 102. The set of requirements may also indicate that the connected vehicle 102 is an SVS data streaming subscriber.

Upon receiving the SVS request, the hub 128 identifies one or more remote sources based on the status information it has received and the set of requirements of the SVS request. The hub 128 may generate a database search query comprising the set of requirements of the SVS request to generate a list of remote sources that potentially satisfy the SVS request. The hub 128 may further filter the list of remote sources by identifying multiple remote sources that have overlapping focus areas encompassing the event of interest. The remote sources 116a, 116b meet the requirements of the SVS request and have focus areas 702, 704 that overlap and encompass the construction zone 706. Therefore, the hub 128 selects remote sources 116a, 116b. The hub 128 may also perform authentication and/or authorization checks to ensure that the connected vehicle 102 is in fact an SVS data streaming subscriber.

Once remote sources 116a, 116b are selected, the hub 128 may direct the remote sources 116a, 116b to stream SVS data to the connected vehicle 102. Accordingly, the remote sources 116a, 116b stream SVS data to the connected vehicle 102.

Upon receipt of the SVS data streams, the connected vehicle 102 may generate a surrounding view based on the SVS data streams from the remote sources 116a, 116b. The camera, or other sensor, of each remote source 116a, 116b may have a field of view that overlaps with another such that all 360 degrees around the event of interest have at least some view coverage of the construction zone 706. The processor 106 of the connected vehicle 102 may stitch together the overlapping portions of the fields of view to create a surround view such that the surround view appears to be a single, seamless image of the construction zone 706. The processor 106 may also modify and/or transform the SVS data streams to give the appearance of the surround view being taken from above the event of interest. The connected vehicle 102 may then provide the surrounding view to an electronic display, via I/O module 112, for presenting to the driver. The surround view may be updated on a time basis or event basis. For example, the surround view may refresh in real-time, 5-second intervals, 1-minute intervals, or the like. As another example, the surround view may be updated to another event of interest on the route of the connected vehicle 102 if the construction zone 706 no longer impacts traffic conditions.

It should now be understood that embodiments disclosed herein include methods and systems for generating context-aware large scale surround view. One or more remote sources may periodically provide status information to a hub to maintain accurate information about each remote source. A driver may send, via a connected vehicle, an SVS request to the hub. Upon receiving the SVS request, the hub may identify remote sources that meet a set of requirements from the SVS request. The hub may then direct the identified remote sources to stream SVS data to the vehicle. The vehicle may synthesize the data from each remote source to generate a surround view.

For the purposes of describing and defining embodiments of the present disclosure, it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A system for generating surrounding views comprising:
a controller programmed to perform operations comprising:
receiving status information of a remote source from the remote source, wherein the remote source is a road side unit;
receiving a surround view system (SVS) request having a set of requirements from a vehicle;
identifying one or more remote sources based on the status information of the one or more remote sources and the set of requirements of the SVS request; and
directing the one or more remote sources to stream SVS data to the vehicle.

2. The system according to claim 1, wherein the status information includes image format, image resolution, view coverage, billing plan, or combinations thereof.

3. The system according to claim 1, wherein the set of requirements includes image format, image resolution, billing plan, event of interest, focus area, or combinations thereof.

4. The system according to claim 1, wherein directing the one or more remote sources to stream SVS data to the vehicle comprises:
directing a first remote source of the one or more remote sources to stream SVS data to a second remote source of the one or more remote sources to generate a pooled SVS data; and
directing the second remote source to stream the pooled SVS data to the vehicle.

5. The system according to claim 1, wherein the controller is programmed to perform operations further comprising:
directing a first remote source of the one or more remote sources to stream SVS data to a second remote source of the one or more remote sources to generate a pooled SVS data; and
directing the second remote source to generate a surround view from the pooled SVS data.

6. The system according to claim 1, wherein identifying one or more remote sources based on the status information of the one or more remote sources and the set of requirements of the SVS request comprises:
receiving the SVS request including an event of interest; and
identifying the one or more remote sources whose view coverages include the event of interest.

7. The system according to claim 1, wherein the controller is programmed to perform operations further comprising soliciting an SVS request having the set of requirements from the vehicle.

8. A method for generating surrounding views comprising:
receiving status information of a remote source from the remote source, wherein the remote source is a road side unit;
receiving a surround view system (SVS) request having a set of requirements from a vehicle;
identifying one or more remote sources based on the status information of the one or more remote sources and the set of requirements of the SVS request; and
directing the one or more remote sources to stream SVS data to the vehicle.

9. The method according to claim 8, wherein the status information includes image format, image resolution, view coverage, billing plan, or combinations thereof.

10. The method according to claim 8, wherein the set of requirements includes image format, image resolution, billing plan, event of interest, focus area, or combinations thereof.

11. The method according to claim 8, wherein directing the one or more remote sources to stream SVS data to the vehicle comprises:
directing a first remote source of the one or more remote sources to stream SVS data to a second remote source of the one or more remote sources to generate a pooled SVS data; and
directing the second remote source to stream the pooled SVS data to the vehicle.

12. The method according to claim 8, further comprising:
directing a first remote source of the one or more remote sources to stream SVS data to a second remote source of the one or more remote sources to generate a pooled SVS data; and
directing the second remote source to generate a surround view from the pooled SVS data.

13. The method according to claim 8, wherein identifying one or more remote sources based on the status information of the one or more remote sources and the set of requirements of the SVS request comprises:
receiving the SVS request including an event of interest; and identifying the one or more remote sources whose view coverages include the event of interest.

14. The method according to claim 8, further comprising soliciting an SVS request having the set of requirements from the vehicle.

15. A vehicle for generating surrounding views comprising:
a controller programmed to perform operations comprising:
determining a focus area related to an event of interest;
transmitting an SVS request to a remote source hub including the event of interest and the focus area;
receiving an SVS data stream of the event of interest from a remote source covering the focus area, wherein the remote source is a road side unit; and
generating a surrounding view based on the SVS data stream from the remote source.

16. The vehicle of claim 15, wherein the controller is programmed to perform operations further comprising receiving a route information via a navigation system, the route information includes the event of interest.

17. The vehicle of claim 15, wherein the event of interest is obtained from the remote source hub.

18. The vehicle of claim 15, wherein the focus area is at least one of a size or a location of the event of interest.

19. The vehicle of claim 15, wherein the controller is programmed to perform operations further comprising providing the surrounding view to an electronic display for presenting to a user.

20. The vehicle of claim 15, wherein the controller is programmed to perform operations further comprising:
receiving a selection of a display mode;
in response to receiving a selection of an event-triggered update mode, determining the focus area related to the event of interest; and
in response to receiving a selection of a time-triggered update mode:
determining a frequency of updating a view of an area; and
refreshing displaying the view of the area based on the frequency.

* * * * *